(12) United States Patent
Hsu

(10) Patent No.: US 7,441,892 B2
(45) Date of Patent: Oct. 28, 2008

(54) CONTACT LENSES

(76) Inventor: Wei-Pin Hsu, No. 51, Baimazhuang, Guangming Village, Zhongli City, Taoyuan County 320 (TW)

( * ) Notice: Subject to any disclaimer, the term of this patent is extended or adjusted under 35 U.S.C. 154(b) by 0 days.

(21) Appl. No.: 11/539,679

(22) Filed: Oct. 9, 2006

(65) Prior Publication Data

US 2007/0252947 A1 Nov. 1, 2007

(51) Int. Cl.
*G02C 7/04* (2006.01)
(52) U.S. Cl. .................... 351/160 R; 351/174
(58) Field of Classification Search ............. 351/160 R, 351/162, 174
See application file for complete search history.

(56) References Cited

U.S. PATENT DOCUMENTS

| 2,129,305 | A | * | 9/1938 | Feinbloom | ................... 351/162 |
| 4,435,050 | A | | 3/1984 | Poler | |
| 4,618,227 | A | | 10/1986 | Bayshore | |
| 4,890,911 | A | | 1/1990 | Sule et al. | |
| 5,059,018 | A | * | 10/1991 | Kanome et al. | ............. 351/162 |
| 7,021,760 | B2 | * | 4/2006 | Newman | ................ 351/160 R |

* cited by examiner

*Primary Examiner*—Darryl J Collins
(74) *Attorney, Agent, or Firm*—Schmeiser, Olsen & Watts

(57) ABSTRACT

An improved contact lens of the present invention, which keeps the eyes moist, avoids irritating the eyes, improves the comfort of fitting, and provides stabilization, comprises: a body with a circumference; at least one pattern located near the circumference, and a maximum width of the contact lens is less than a maximum value in such that the contact lens can avoid being restricted by eye muscles while fitting onto eyes.

11 Claims, 5 Drawing Sheets

CONTACT LENSES

BACKGROUND OF THE INVENTION

1. Field of the Invention

The present invention relates to contact lenses, and, more particularly, to contact lenses having at least one pattern on the circumference of the contact lens.

2. Description of the Related Art

Contact lenses are more convenient than eyeglasses for most occasions. Therefore, it has recently become more popular. However, the conventional contact lens is circular with a smooth circumference and the varieties and benefits of a different structure of contact lens have been neglected for a long time.

U.S. Pat. No. 4,435,050 discloses the contact lens having window structures that make the contact lens more flexible and the contact lens fits the cornea of human eyes better while wearing according to structural mechanics. In addition, it is also suited for correcting astigmatism and adapted to be made out of glass.

U.S. Pat. No. 4,618,227 discloses the contact lens having micro channels on portions of the inside circumference attaching to the cornea. Therefore, the contact lens wearer can get improved tear distribution and comfort. In addition, this structure is especially suited for a multifocal contact lens which is designed to correct presbyopia.

U.S. Pat. No. 4,890,911 discloses the contact lens having a supporting structure for keeping a micro distance between the contact lens and the cornea provide more oxygen supply to the eyes and to improve tear distribution.

In the above cases, the contact lens structure is hollow, has micro channels, or has a narrow strip, respectively. These kinds of designed structures have problems such as a higher manufacture cost and a fragile structure. Furthermore, there is little practicality of these contact lens without considering of tears distribution and irritation while wearing the contact lens. However, the conventional contact lens causes inflammation and is uncomfortable because of dryness, not enough lubricity and the friction between eye and the contact lens. Consequently, these contact lens can damage the cornea of the eye.

It is an object of the present invention to provide a contact lens that keeps the eyes moist and avoids eye irritation. Furthermore, it can improve the comfort and stabilization.

SUMMARY OF THE INVENTION

An object of the present invention is to provide a contact lens which keeps the eyes moist, avoids irritating the eyes and improves comfort and stabilization. There are more contact portions between contact lenses and tears when wearing contact lenses that have at least one pattern on the circumference of the contact lenses as to keep more tears. It also reduces the sensitivity of the eyes during the fitting by providing comfort and stabilization. While wearing contact lenses, eyelids will push the contact lens and cause the lens to move. The increase of the tears quantity which is kept by the contact lens increases the mass of the contact lens, and there will be less acceleration of the contact lens caused by blinking force. This will improve the stabilization due to less displacement caused by sliding. Such that, the contact lens according to a preferred example of the present invention can keep the eyes moist and avoid irritating the eyes. Furthermore, it can improve comfort and stabilization of the contact lens.

In accordance with one aspect of the present invention, there is provided a contact lens comprising: a body with a circumference; at least one pattern on the circumference and a maximum width of the contact lens is less than a maximum value such that the contact lens avoids being restricted by eye muscles while fitting the eyes. Therefore, a contact lens according to this invention which keeps eyes moist and avoids irritating eyes is disclosed.

The present invention and its various embodiments are better understood upon consideration of the detailed description below in conjunction with the accompanying drawings and claims.

DETAILED DESCRIPTION OF THE PREFERRED EMBODIMENTS

Figure 1:
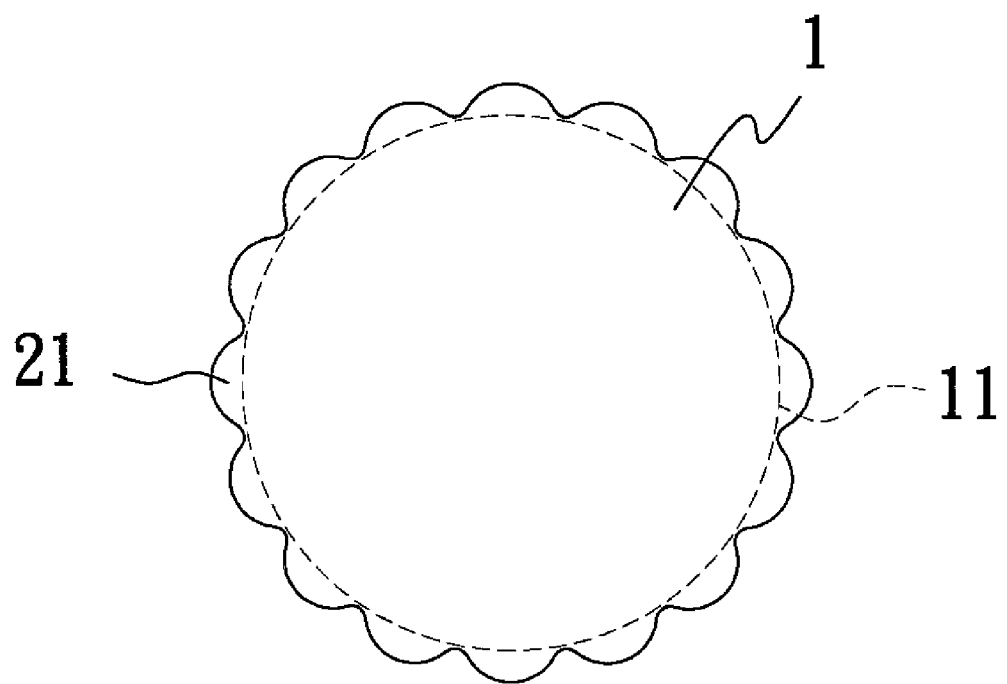
FIG. 1 is a top view of a contact lens according to a preferred embodiment of the invention.
Figure 2:
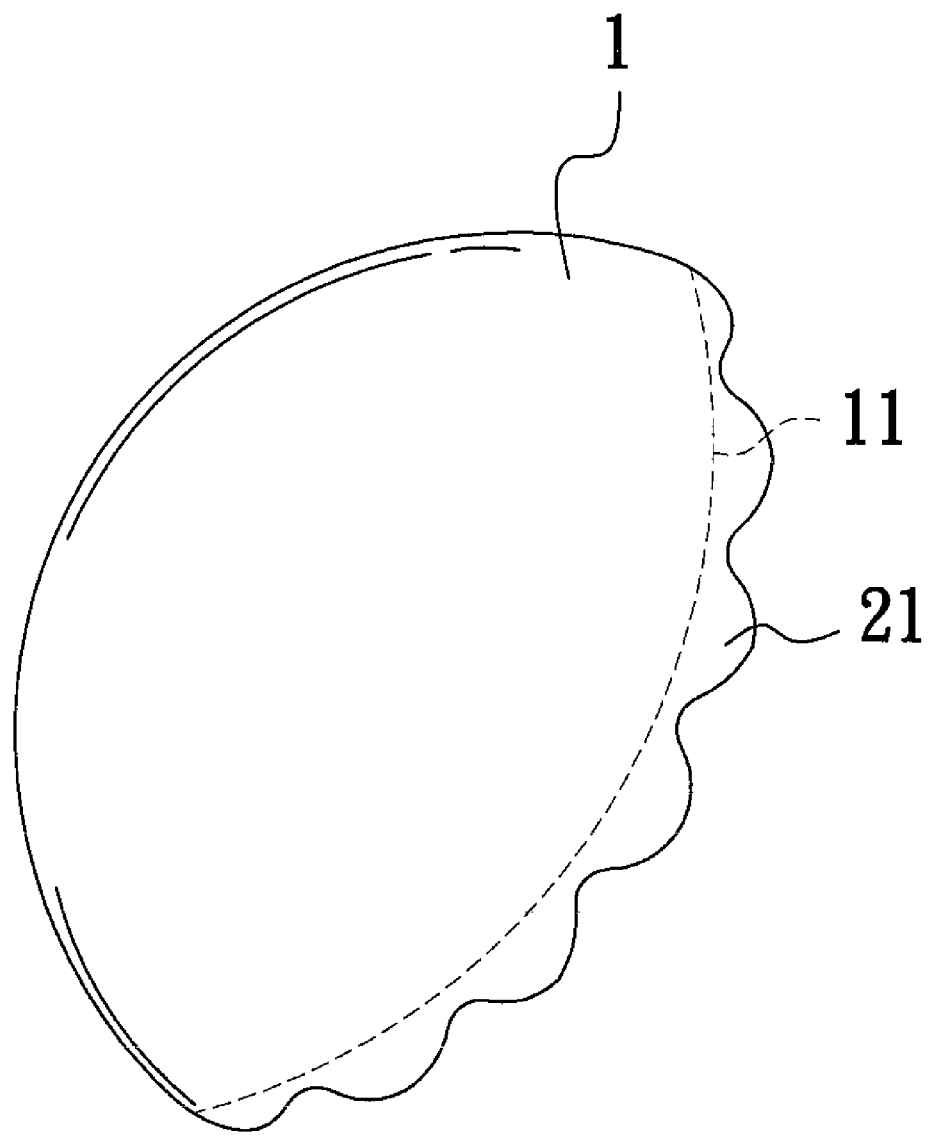
FIG. 2 is an oblique view of a contact lens according to a preferred embodiment of the invention.

FIGS. 1 and 2 are a top view and an oblique view of a contact lens, respectively, having a body 1 and arcs 21 according to a preferred embodiment of the invention. Generally speaking, the diameter of the human eyeball is between 21 millimeters and 26 millimeters, while the diameter of the cornea is between 11 millimeters and 12 millimeters. Also, the distance between the superior rectus and the inferior rectus is about 25 millimeters and the distance between the medial rectus and the lateral rectus is about 24 millimeters. In the market, the diameter of a rigid contact lens is between 8 millimeters and 11 millimeters and the diameter of a soft contact lens is between 12 millimeters and 16 millimeters. Therefore, the present invention provides an improved design of a contact lens that is more comfortable to wear and can be utilized either in the rigid lens or the soft lens. The improved contact lens of the present invention in accordance with a preferred example comprises the body 1 having a circular base with a circumference 11, and a wavy pattern 21, wherein the maximum width of the contact lens is designed to be less than 18 millimeters, such that, the contact lens can avoid being restricted by the eye muscles while fitting the eyes. For example, when the eyelids push the contact lens while the eyes are blinking, the contact lens can rotate and slide against to eyeball without interfering with the extraocular muscle. The maximum width of the rigid contact lens is preferred to be less than the diameter of the cornea (less than 12 millimeters). The maximum width of the soft contact lens is not limited by the diameter of the cornea, but it is preferred that the maximum width of the soft contact lens is less than 16 millimeters in consideration of the convenience of wearing. In addition, the ratio between the distance from the circumference 11 of the body 1 to the edge of one of the patterns in a radial direction and the maximum distance from the central point of the body to the circumference 11 of the body 1 is approximately between 1:2 and 1:400, preferably between 1:4 and 1:100.

The wavy pattern 21 comprises a plurality of waves as shown in FIGS. 1 and 2, wherein the wavy pattern 21 and the circumference 11 efficiently increase the contact portions between the contact lens and tears, such that the contact lens can keep more tears. There is about 1.57 quantity of tears with half circle more than the conventional contact lens since the perimeter is 1.57 times longer than the conventional contact lens. Therefore, the mass is increased. Force is equivalent to the mass times the acceleration according to Newton's second law. The increase in mass accords with less acceleration according to the same force caused by the blink and improves the stabilization due to less displacement caused by sliding. Furthermore, the tears kept by circumference 11 of the contact lens increase the lubrication, such that it reduces the friction between eye and the contact lens while blinking, thus there is improved stabilization of the contact lens. The lubrication of tears also keeps the contact lens from irritating the eyes by improving comfort. In addition, the smooth circumference decreases the amount of secretions.

Figure 3:
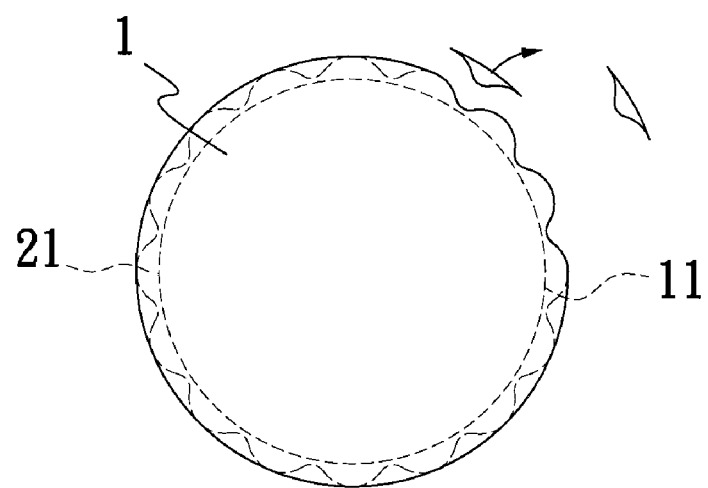
FIG. 3 is a top view of processing a contact lens according to a preferred embodiment of the invention.

FIG. 3 is a top view of processing a contact lens having a body 1 and a wavy pattern with a plurality of waves 21 according to the preferred embodiment of the invention. During the processing of the contact lens, the patterns are set on the circumference 11 of the contact lens and the pieces may be cut off by turning, laser or machine. In addition, the contact lens including the patterns 21 on the circumference 11 can be made by casting.

Figure 4:
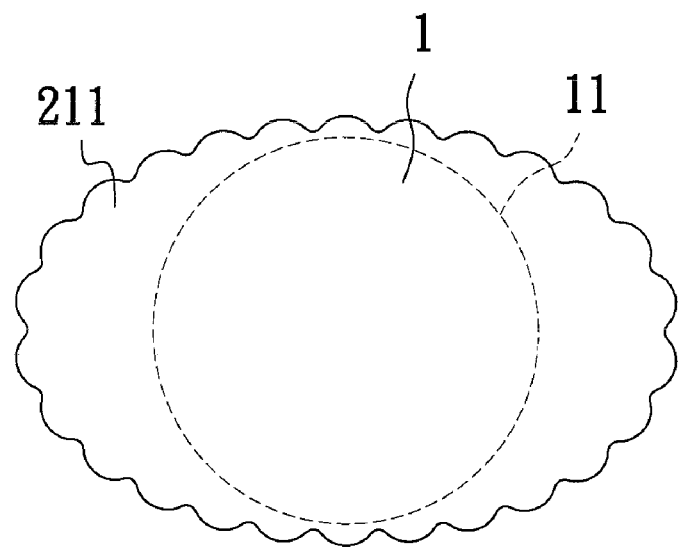
FIG. 4 is a top view of a contact lens according to another embodiment of the invention.

FIG. 4 is a top view of processing a contact lens having a body 1 and a pattern 211 according to another embodiment of the invention. The body 1 and the pattern 211 can be formed into an oval shape, wherein the pattern 211 is made by setting arcs in an ellipse path, and it has longer perimeter. The design of the oval-shaped contact lens provides better effects than the one disclosed in FIG. 1.

Figure 5:
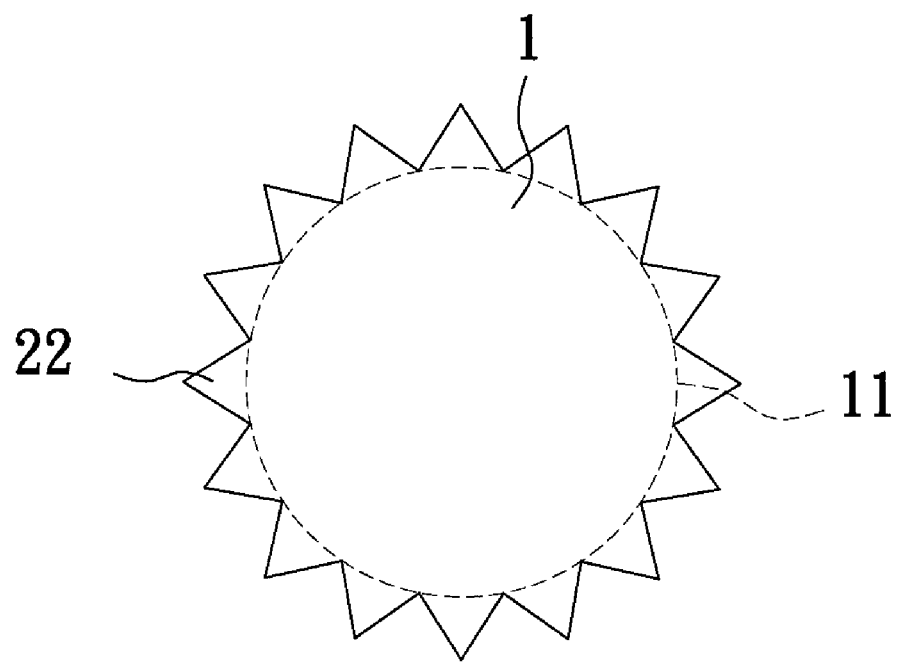
FIG. 5 is a top view of a contact lens according to another embodiment of the invention.

FIG. 5 is a top view of a contact lens having a body 1 and a pattern with a plurality of angular shaped units 22 according to another embodiment of the invention. There is a longer perimeter because of the pattern with the angular shaped units 22 and the contact lens is able to retain more tears. The pattern having the angular shaped units retains twice the amount of tears as compared to the conventional design of the contact lens. Since the perimeter has double length, it can keep the eyes moist and avoid irritating the eyes. Furthermore, it improves the comfort of wearing and provides stabilization.

Figure 6:
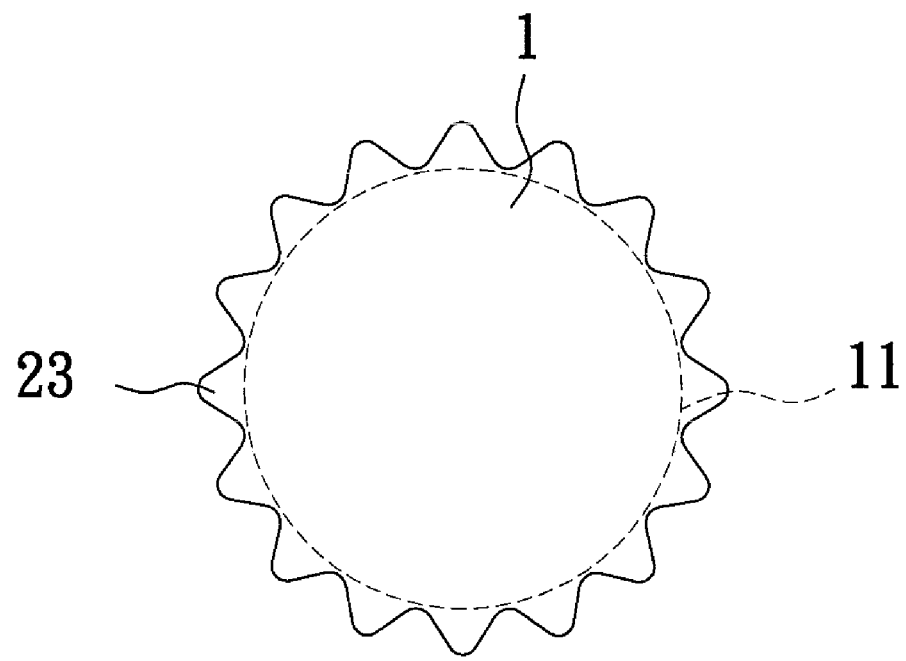
FIG. 6 is a top view of a contact lens according to another embodiment of the invention.

FIG. 6 is a top view of a contact lens having a body 1 and capes with round corner 23 according to another embodiment of the invention. This embodiment is similar to the one disclosed in FIG. 5. Furthermore, it improves comfort while fitting on the eyes and decreases the amount of secretions since the improved contact lens comprises a circular base body with a pattern having angular-shaped units.

Figure 7:
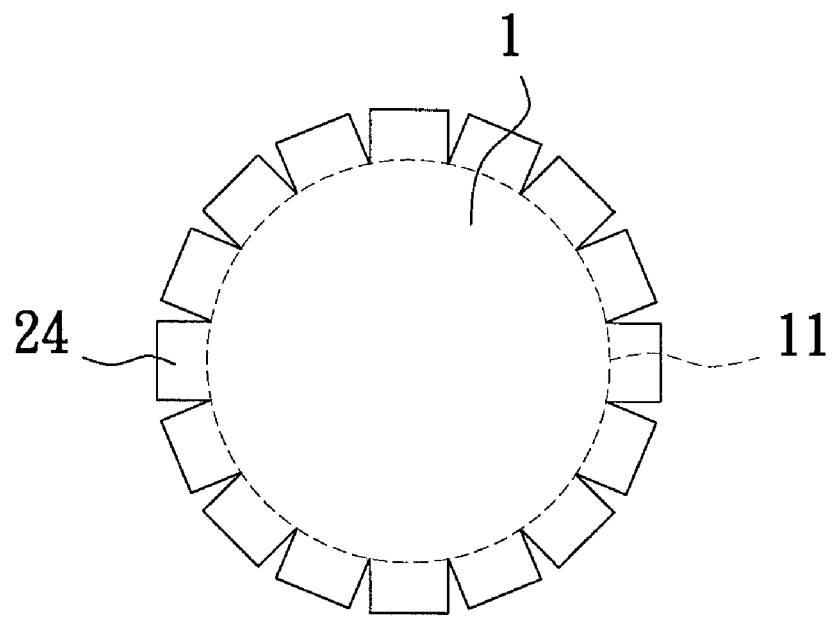
FIG. 7 is a top view of a contact lens according to another embodiment of the invention.

FIG. 7 is a top view of a contact lens having a body 1 and squares 24 according to another embodiment of the invention. The contact lens has more contact portions with eyes because of the squares 24 and the circumference 11. The tears attached to the circumference 11 are double compare to the conventional contact lens since the squares makes the contact portions double.

Figure 8:
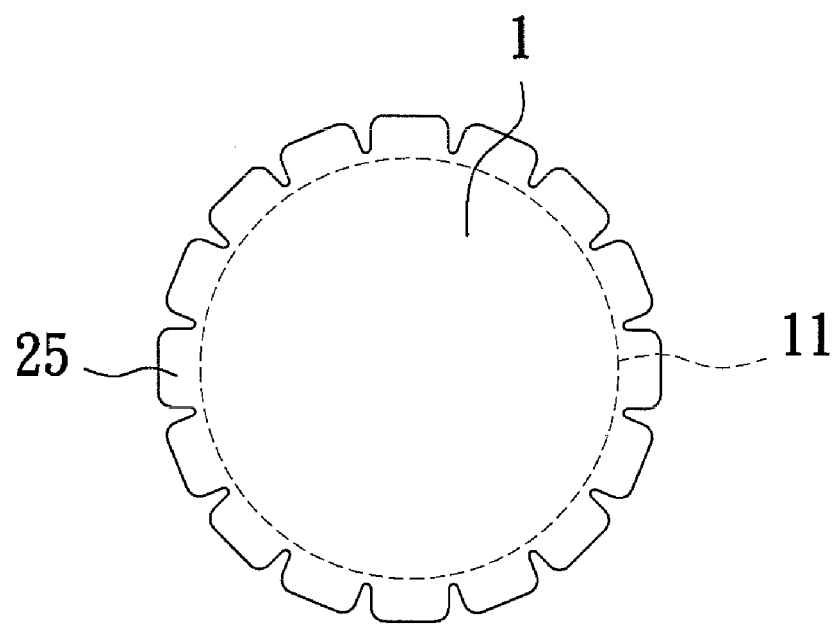
FIG. 8 is a top view of a contact lens according to another embodiment of the invention.

FIG. 8 is a top view of a contact lens having a body 1 and squares with round corner 25 according to embodiment of the invention. The circumference 11 having squares with round corner 25 which keeps the eyes moist and increases great stabilization as well as improves the comfort of fitting, such that there is less sensitivity resulting from the irritation of the eyes. Furthermore, there is an improvement in the comfort and fewer accumulations of secretions because of the design of the present invention with round corner pattern.

In conclusion, the contact lens according to the present invention keeps eyes moist and increases drag while sliding. Furthermore, it reduces displacement of the contact lens caused by blinking or gravitation, and avoids irritating the eyes. While the contact lens is worn, the structure of the contact lens can keep the tears from flowing down and keep the eyes moist. In addition, the non-smooth structure on the circumference of the contact lens also helps produce tear film.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. A contact lens comprising:
a body with a circumference; and
at least one pattern deposited near the circumference of the body that creates a plurality of contact portions in a radial direction between the contact lens and an eye, wherein a maximum width of the contact lens is less than a maximum value such that the contact lens avoid being restricted by eye muscles while fitting eyes, and a ratio between a maximum distance from the circumference of the body to an edge of the pattern in the radial direction passing through a central point of the body and a maximum distance from the central point of the body to the circumference of the body is between 1:2 and 1:400.

2. The contact lens of claim 1, wherein the maximum value is less than 18 millimeters.

3. The contact lens of claim 2, wherein the contact lens is rigid lens, and the maximum value is less than 12 millimeters.

4. The contact lens of claim 2, wherein the contact lens is soft lens, and the maximum value is less than 16 millimeters.

5. The contact lens of claim 1, wherein the ratio is between 1:4 and 1:100.

6. The contact lens of claim 1, wherein the pattern comprises a plurality of waves.

7. The contact lens of claim 1, wherein the pattern comprises a plurality of arcs.

8. The contact lens of claim 1, wherein the pattern comprises a plurality of angular-shaped units.

9. The contact lens of claim 1, wherein the pattern comprises a plurality of angular-shaped units with round corners.

10. The contact lens of claim 1, wherein the pattern can be formed with a plurality of square-shaped units.

11. The contact lens of claim 1, wherein the pattern comprises a plurality of square-shaped units with round corners.

* * * * *